Dec. 27, 1960 G. B. ROSENBERGER 2,966,305

SIMULTANEOUS CARRY ADDER

Filed Aug. 16, 1957 8 Sheets-Sheet 1

INVENTOR.
GERALD B. ROSENBERGER

BY Marshall M. Truex

ATTORNEY

Dec. 27, 1960 G. B. ROSENBERGER 2,966,305

SIMULTANEOUS CARRY ADDER

Filed Aug. 16, 1957 8 Sheets-Sheet 2

Dec. 27, 1960 G. B. ROSENBERGER 2,966,305
SIMULTANEOUS CARRY ADDER
Filed Aug. 16, 1957 8 Sheets-Sheet 5

| X | Y | OUTPUT |
|---|---|---|
| UP | UP | DOWN |
| UP | DOWN | UP |
| DOWN | UP | UP |
| DOWN | DOWN | UP |

| X | Y | Z | OUTPUT |
|---|---|---|---|
| UP | UP | UP | DOWN |
| DOWN | UP | UP | DOWN |
| UP | DOWN | UP | DOWN |
| DOWN | DOWN | UP | UP |
| UP | UP | DOWN | UP |
| DOWN | DOWN | DOWN | UP |
| DOWN | UP | DOWN | UP |
| UP | DOWN | DOWN | UP |

| INPUT | OUTPUT |
|---|---|
| UP | DOWN |
| DOWN | UP |

TRUTH TABLE

| | | | | | | | | |
|---|---|---|---|---|---|---|---|---|
| Xn | 1 | 1 | 0 | 0 | 1 | 1 | 0 | 0 |
| Yn | 1 | 0 | 1 | 0 | 1 | 0 | 1 | 0 |
| Cn-1 | 0 | 0 | 0 | 0 | 1 | 1 | 1 | 1 |
| $S_1$ | 0 | 1 | 1 | 0 | 1 | 0 | 0 | 1 |
| $S_0$ | 1 | 0 | 0 | 1 | 0 | 1 | 1 | 0 |
| $C_n$ | 1 | 0 | 0 | 0 | 1 | 1 | 1 | 0 |

Dec. 27, 1960 G. B. ROSENBERGER 2,966,305

SIMULTANEOUS CARRY ADDER

Filed Aug. 16, 1957 8 Sheets-Sheet 6

Dec. 27, 1960 G. B. ROSENBERGER 2,966,305

SIMULTANEOUS CARRY ADDER

Filed Aug. 16, 1957 8 Sheets-Sheet 7

Dec. 27, 1960 | G. B. ROSENBERGER | 2,966,305

SIMULTANEOUS CARRY ADDER

Filed Aug. 16, 1957 | 8 Sheets-Sheet 8

United States Patent Office 2,966,305

Patented Dec. 27, 1960

2,966,305

SIMULTANEOUS CARRY ADDER

Gerald B. Rosenberger, Wappingers Falls, N.Y., assignor to International Business Machines Corporation, New York, N.Y., a corporation of New York Filed Aug. 16, 1957, Ser. No. 678,573

8 Claims. (Cl. 235—175)

This invention relates to adders and more particularly to an adder for the parallel addition of binary numbers in which the serial carry operation arising in such parallel addition is broken up into groups for serial carry operation by such groups, carries between groups being generated simultaneously with the addition of the numbers.

Many large scale binary computers must allow for maximum full carry time in each addition since it is possible for a carry generated in the first position to ripple through the highest order position of the adder. An illustration of such a case would be in the addition of the decimal number 7 expressed in binary form as 0111 and the decimal number 1 expressed in binary form as 0001. From the addition of these two numbers it will be noted that the carry is propagated from the lowest order position and is rippled from order to order to the fourth order position in the binary sum 1000. The propagation of the carry takes time and the resulting delay is accumulative. Accordingly, the time alloted for the carry process must be alloted on the basis of the worst case which would be the time it takes a carry to ripple through all of the orders of the adder although the average carry sequences are shorter in time than the maximum. Since a need has been shown for high computation speeds, at least some speed up should be expected to come from the decrease in operation time of basic arithmetic apparatus. The ripple carry process is one such operation in which significant decreases in time may be made since the resolution of the sum in any bit of the adder may have to wait for carry signal to propagate through all lower order bits.

It will be shown hereafter that the carry into any adder bit may be expressed as a function of the original "carry in" and all lower order bit positions of the adder. Utilization of this principle at the two extremes is mentioned briefly so that it will clarify the basic scheme as well as emphasize the problems involved. One extreme is to ripple the carry two bits at a time which means the original carry into one position will be used to form a carry into the third bit while it was performing its function in bits 1 and 2. A carry into the third bit would be used to generate the "carry in" for the fifth bit while it was performing its function in bits 3 and 4. The other extreme is to form the carry into each adder bit immediately, this means having an independent carry generation in the circuit for each adder bit. The complexity of these circuits increases approximately factorial with the increase in the order above. Neither of the two extremes seems to offer much promise because in one instance operation is too slow, and in the other instance circuit complexity and cost are excessive.

One object of this invention is to find the best compromise between speed and circuit complexity. Many schemes are possible including the development of one carry for every four bits and another for generating one carry for every six bits, but since these are very similar to the octal scheme and because they do not afford all of the advantages that the nine bit scheme does, they have assumed secondary importance to the nine bit schemes. The preferred embodiment of this invention is directed to the nine bit octal scheme wherein the nine bit adder is divided into groups of three bits and the carry is rippled through bits 1, 2 and 3 simultaneously with the carry rippling through bits 4, 5 and 6 and through bits 7, 8 and 9. The carries into bit positions 4, 7 and 10 are generated coincidentally with the addition of the bits in the manner to be described later. The present invention provides an adder which develops a carry input to the highest order stage long before all of the sums of the lower order bits have been resolved.

It is an object of this invention to provide an improved adder in which the speed of operation is increased by employing simultaneous carry with the orders in groups to increase carry propagation speed.

It is another object of this invention to provide an adder for forming the sum of binary numbers comprising an adder order for each binary position, each effective to form the sum of at least two numbers at an output and for generating a carry at another output, circuit connections for each lower adder order carry to each higher order adder, and transistor logical circuits responsive to the carry status of each adder order and the "carry in," if any, into the lowest adder order for generating a carry signal as an output of the adder in coincidence with the addition of the binary numbers.

It is a still further object of this invention to provide an improved solid state parallel adder in which the serial carry operation is divided into groups for serial carry propagation by such groups and carries between groups are generated simultaneously with the addition of the numbers.

It is another object of this invention to provide an improved adder order for forming the sum of two binary numbers.

It is another object of this invention to provide an improved full adder using solid state circuit elements.

It is another object of this invention to provide logical circuits for forming the carry out of a group of adders simultaneously with the forming of the sum of the binary input.

It is another object of this invention to provide a carry generation circuit for a group of adder orders comprising negative logic circuits.

It is a still further object of this invention to provide a chain of carry generation circuits, one for each group of adder orders, in which each successive carry generation circuit derives signals representing the carry status of the lower order adder groups to provide carry signals between adder groups.

It is another object of this invention to provide an adder comprising three groups of three adder orders and three carry generation circuits, the first of the carry generation circuits providing a carry into the fourth order which is a function of $X_1$, $Y_1$, $X_2$, $Y_2$, $X_3$, $Y_3$ and $C_{in}$, a second of the carry generation circuits providing a carry into the seventh order of the adder which is a function of $X_1$, $Y_1$, $X_2$, $Y_2$, $X_3$, $Y_3$, $X_4$, $Y_4$, $X_5$, $Y_5$, $X_6$, $Y_6$ and $C_{in}$, and the third carry generation circuit providing a carry out of the ninth adder order which is a function of the binary inputs to all of the adder orders and the "carry in" signal.

Other objects of the invention will be pointed out in the following description and claims and illustrated in the accompanying drawings which disclose by way of example the principle of the invention and the best mode which has been contemplated of applying that principle.

In the drawings:

Figures 1*a*, 1*b* and 1*c*, placed one above the other, in that order, form the logical block diagrams for nine bits of the simultaneous carry adder of the present invention.

Figure 1A:
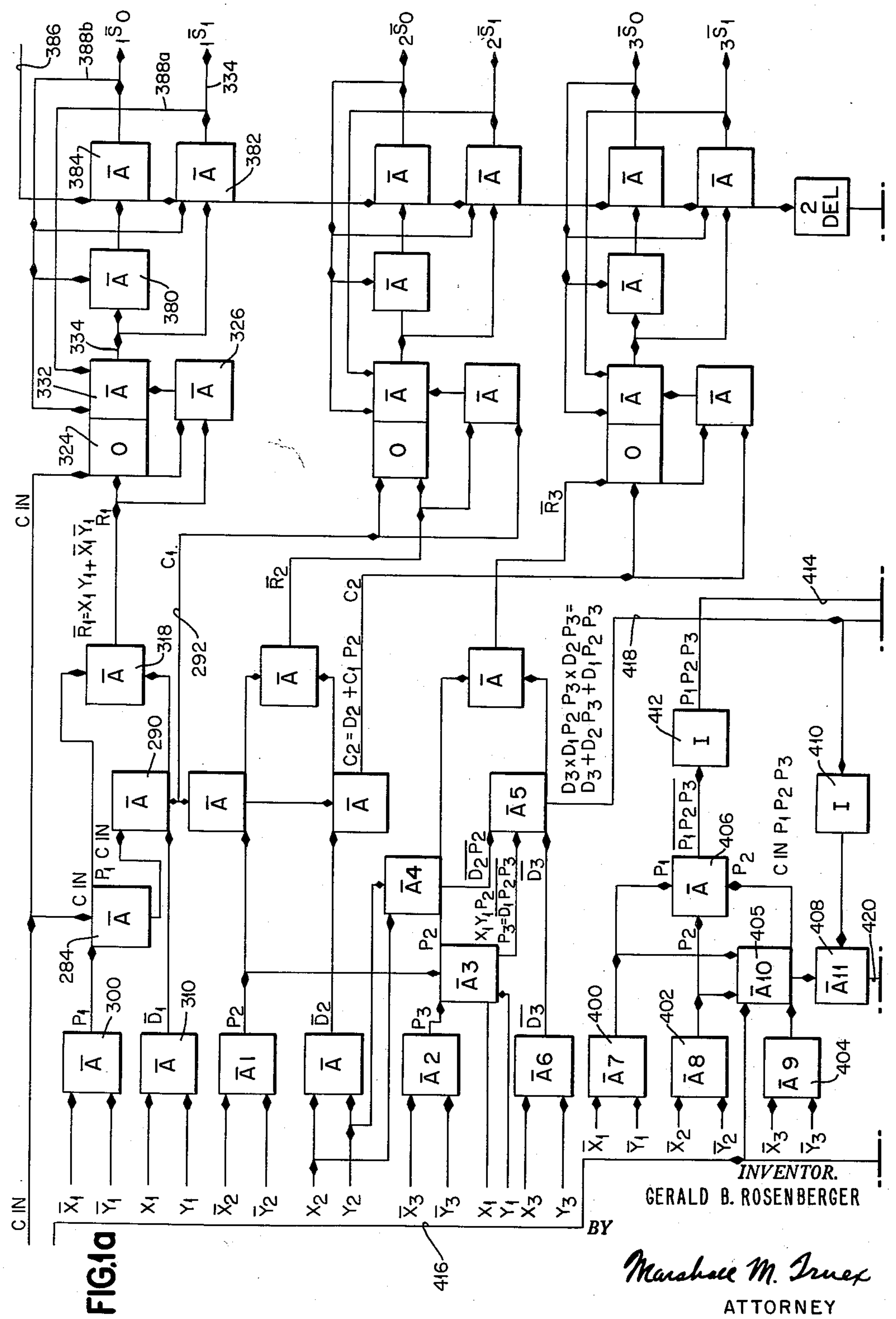
Figure 1B:
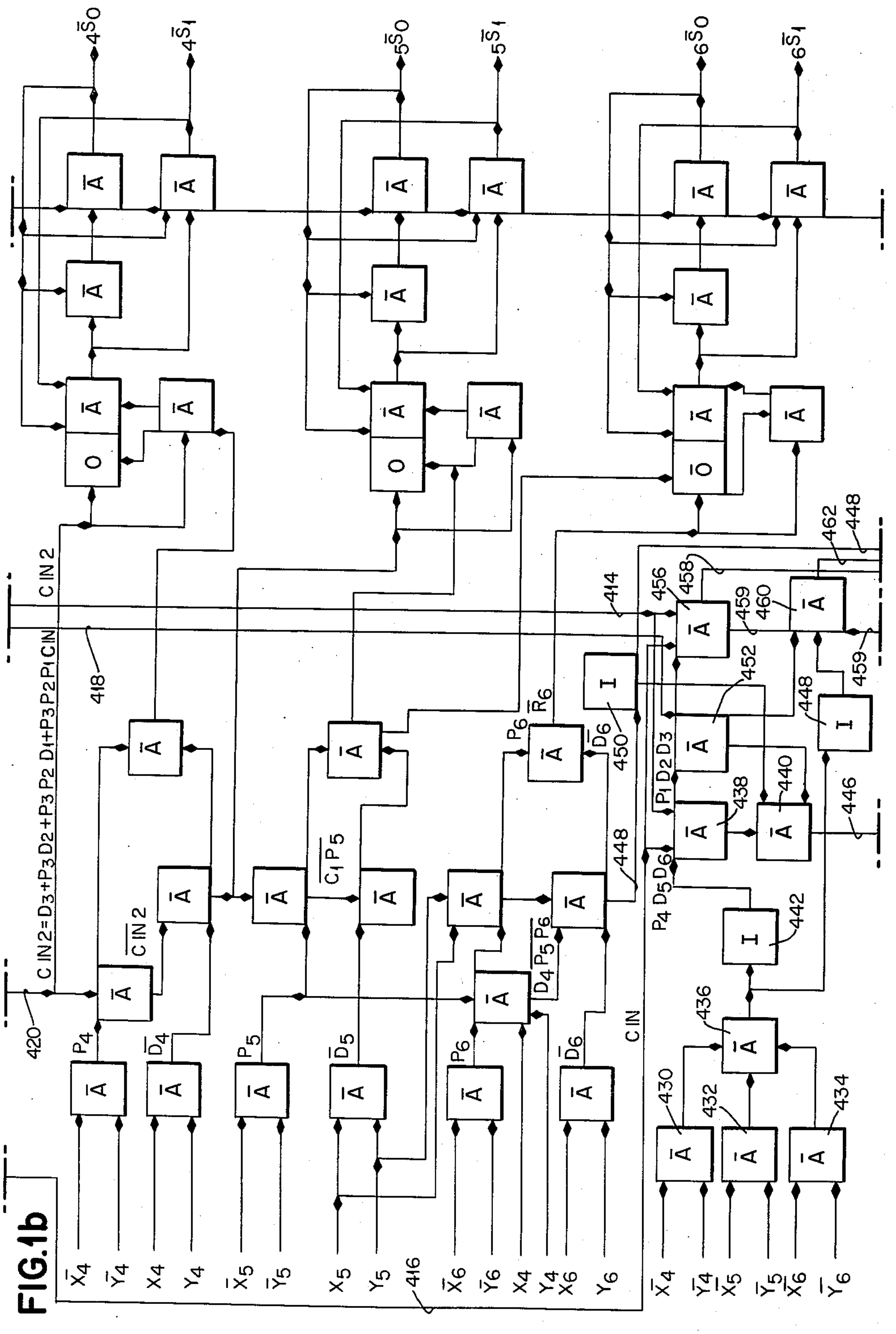
Figure 1C:
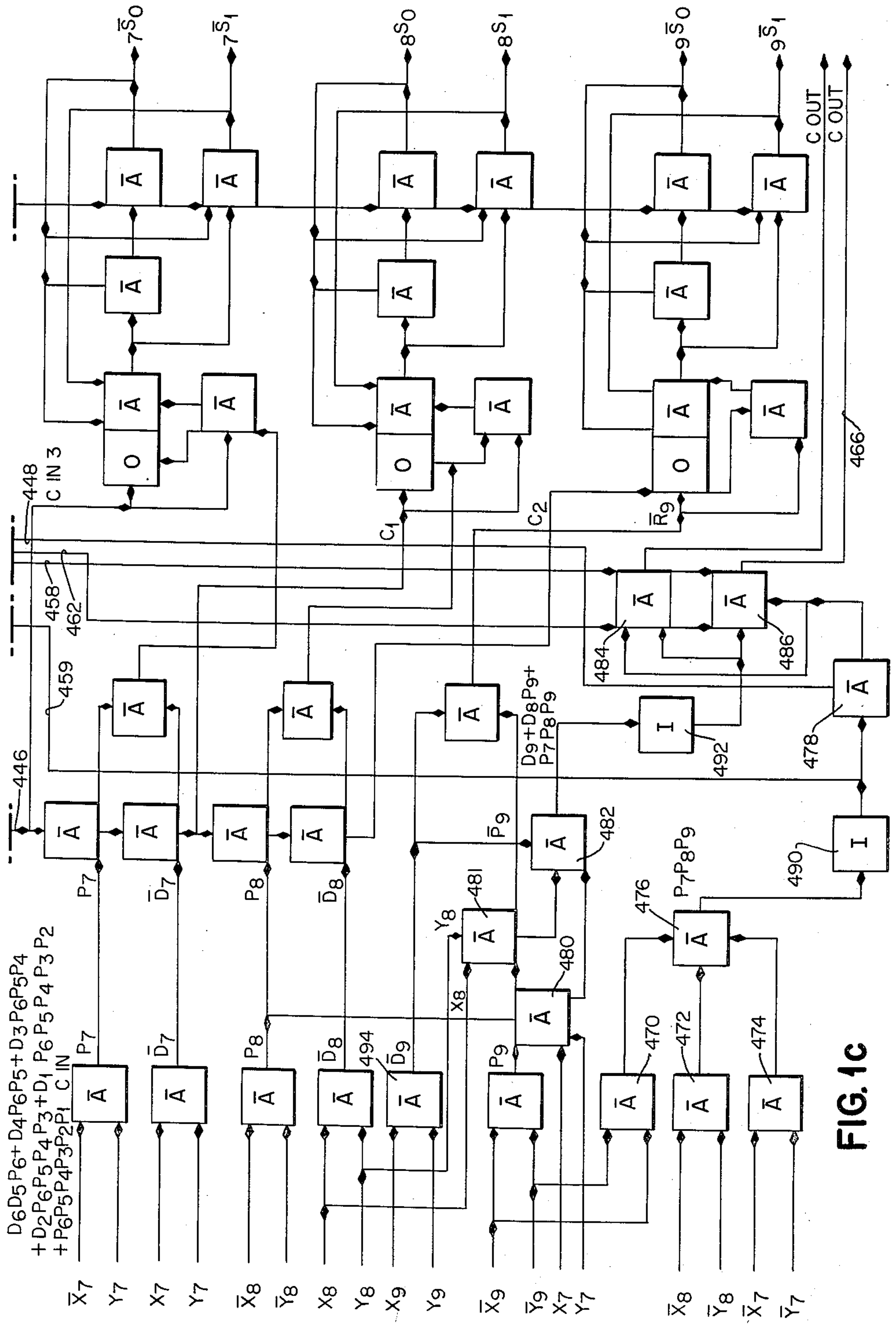
Figure 2:
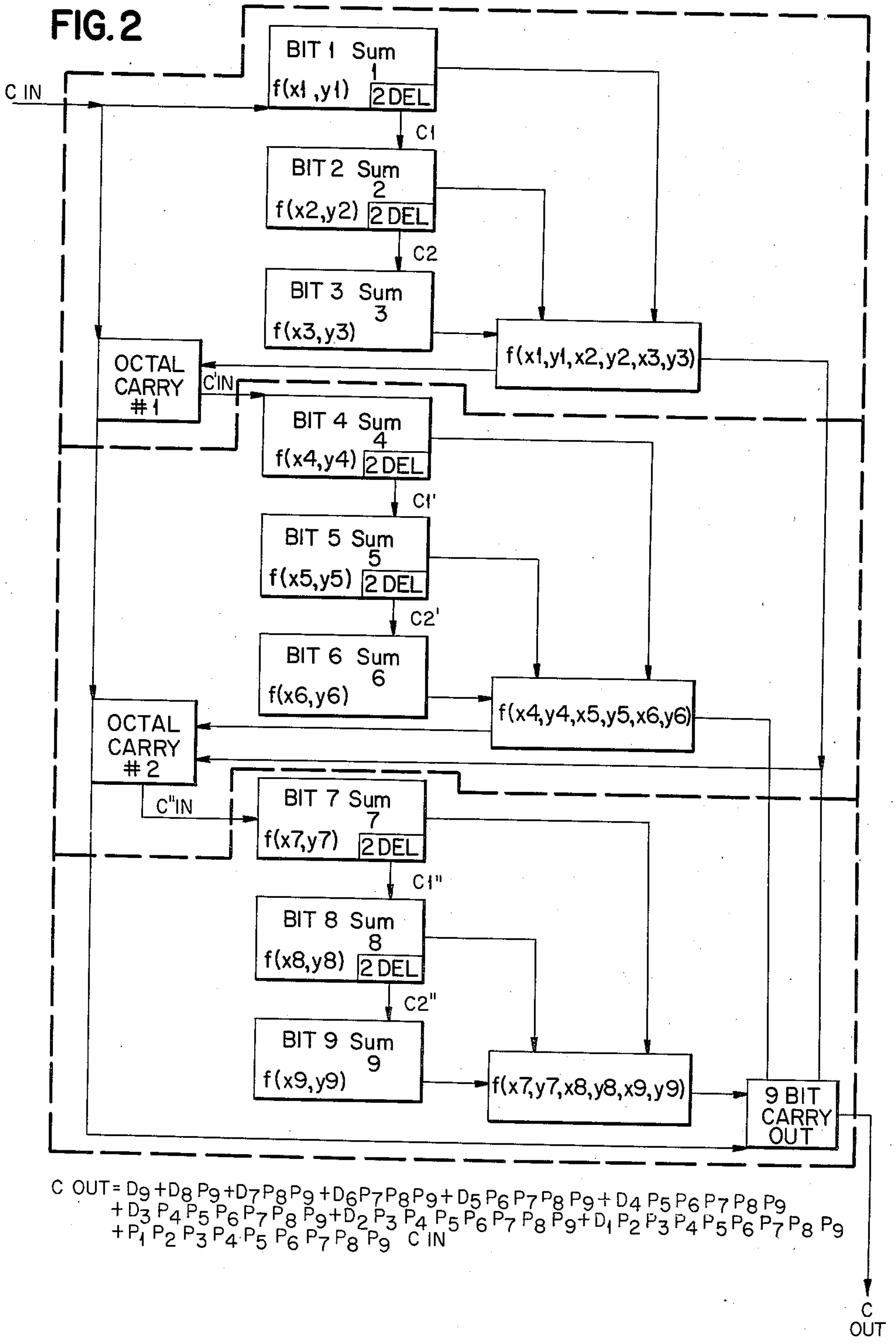
Figure 2 is the functional block diagram of the adder of Figure 1.

The logical block diagram of Figures 1*a*, 1*b* and 1*c* illustrate the manner in which the principles of the invention shown functionally is performed in Figure 2.

Figure 3:
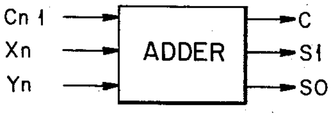
Figure 3 is a block diagram of a full adder and its truth table.

With reference to the adder of Figure 3 and its associated truth table, it can be shown that $$C_n = x_n y_n \overline{C}_{n-1} + x_n \overline{y}_n C_{n-1} + \overline{x}_n y_n C_{n-1} + x_n y_n C_{n-1}$$

(read $C_n$ equals $x_n$ and $y_n$ and $\overline{C}_{n-1}$ or $x_n$ and $\overline{y}_n$ . . .

$$C_n = x_n y_n (C_{n-1} + \overline{C}_{n-1}) + C_{n-1} x_n (y_n + \overline{y}_n) + C_{n-1} y_n (x_n + \overline{x}_n)$$

$$C_n = x_n y_n + C_{n-1}(x_n + y_n)$$

Since $C_n = C(\text{out})$ and $C_{n-1} = C(\text{in})$, the general expression for the carry out of a stage is a function of the "carry in."

The expression for the carry out of the N stage will be derived from the truth table and used to develop a simultaneous carry expression—that is, to show how any carry can be expressed as a function of the carry into the lowest order bit without waiting for the carry to ripple through all the lower order bits.

Now, if $C_n = x_n y_n + C_{n-1}(x_n + y_n)$, the carry out of the lowest order bit, $C_1$ is:

$$C_1 = x_1 y_1 + C_{in}(x_1 + y_1)$$

and $$C_2 = x_2 y_2 + C_1(x_2 + y_2)$$

Substituting $C_1$ in the expression for $C_2$ $$C_2 = x_2 y_2 + x_1 y_1 (x_2 + y_2) + (x_1 + y_1)(x_2 + y_2) C_{in}$$

For simplification let $x_n y_n = D_n$ and $x_n + y_n = P_n$. Then $$C_1 = D_1 + P_1 C_{in}$$
$$C_2 = D_2 + D_1 P_2 + P_1 P_2 C_{in}$$
$$C_3 = D_3 + D_2 P_3 + D_1 P_2 P_3 + P_1 P_2 P_3 C_{in}$$
$$C_4 = D_4 + D_3 P_4 + D_2 P_3 P_4 + D_1 P_2 P_3 P_4 + P_1 P_2 P_3 P_4 C_{in}$$

and $$C_{45} = D_{45} + D_{44} P_{45} + D_{43} P_{44} P_{45} + \ldots + \ldots P_1 P_2 P_3 P_4 \ldots P_{41} P_{42} P_{43} P_{44} P_{45} C_{in}$$

As shown by the derivation and as illustrated in Figure 2, the carry into the fourth position is a function of $x_1, y_1, x_2, y_2, x_3, y_3$, and the carry in $(C_{in})$. More specifically, the carry into the fourth position $(C_3)$ is equal to $D_3$ or $D_2$ and $P_3$ or $D_1$ and $P_2$ and $P_3$ or $P_1$ and $P_2$ and $P_3$ and $C_{in}$. The carry into the seventh position is a function of $x_1, y_1, x_2, y_2, x_3, y_3, x_4, y_4, x_5, y_5, x_6, y_6$, and carry into the first position $(C_{in})$.

Accordingly, the carry into the seventh position can be expressed as $D_6$ or $D_5$ and $P_6$ or $D_4$ and $P_6$ and $P_5$, or $D_3$ and $P_6$ and $P_5$ and $P_4$ or $D_2$ and $P_6$ and $P_5$ and $P_4$ and $P_3$ or $D_1$ and $P_6$ and $P_5$ and $P_4$ and $P_3$ and $P_2$ or $P_6$ and $P_5$ and $P_4$ and $P_3$ and $P_2$ and $P_1$ and $C_{in}$. Similarly, the carry into the tenth position is the function of $x_1, y_1, x_2, y_2, x_3, y_3, x_4, y_4, x_5, y_5, x_6, y_6, x_7, y_7, x_8, y_8, x_9, y_9$, and carry into the first position. Accordingly, this expression is $C_{out}$ equals $D_9$ or $D_8$ and $P_9$ or $D_7$ and $P_8$ and $P_9$ or $D_6$ and $P_7$ and $P_8$ and $P_9$ or $D_5$ and $P_6$ and $P_7$ and $P_8$ and $P_9$ or $D_4$ and $P_5$ and $P_6$ and $P_7$ and $P_8$ and $P_9$ or $D_3$ and $P_4$ and $P_5$ and $P_6$ and $P_7$ and $P_8$ and $P_9$ or $D_2$ and $P_3$ and $P_4$ and $P_5$ and $P_6$ and $P_7$ and $P_8$ and $P_9$ or $D_1$ and $P_2$ and $P_3$ and $P_4$ and $P_5$ and $P_6$ and $P_7$ and $P_8$ and $P_9$ or $P_1$ and $P_2$ and $P_3$ and $P_4$ and $P_5$ and $P_6$ and $P_7$ and $P_8$ and $P_9$ and $C_{in}$.

In a forty-five bit adder of the parallel type in which the carries are rippled through from the units position to the last position, a large delay might be encountered and any order bit must necessarily wait for the "carry in" before the sum can be assumed correct. The time saving feature of the present invention is that simultaneously with the ripple action through an octal group of three bits in the adder, carries are being formed that service bits 4, 7 and 10 so that carry propagation and resolution through each octal bit occur simultaneously. In the present invention and considering a nine bit adder with the first three bits, the second three bits and the last three bits operate as parallel ripple carry adders while carries are being formed simultaneously which will be applied by the bits 4, 7, and 10. The effect of the overall adder is that the time is reduced by one-third since the ripple carry occurs in three-bit units rather than in nine-bit units which operate serially. The original carry in $(C_{in})$ encounters only two delays for every nine bits or a total of ten delays for forty-five bits.

In this application the following conventions will be used: when X equals 1, $\bar{X}$ equals 0, and when Y equals 1, $\bar{Y}$ equals 0. The boolean expression (1) will correspond to ground physically, the boolean expression (0) will correspond to −3 volts physically.

INVERTER

Figure 4:
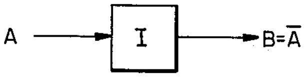
Figure 4 is a block diagram of an inverter with its related truth table.
Figure 5:
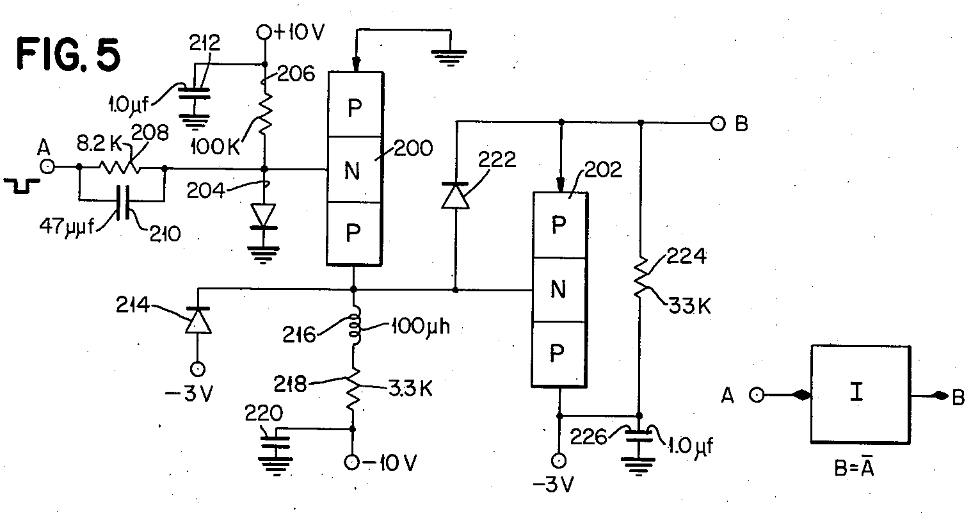
Figure 5 is the circuit diagram for a transistor inverter for performing the inversion as indicated by the logical block of Figure 4.

In Figure 4 there is shown a functional block diagram of an inverter having an input A and an output $\bar{A}$. The table adjacent to the block diagram is the relationship of the signals between the input and output. A suitable circuit arrangement is shown in Figure 5 and comprises a junction transistor 200 arranged in a grounded emitter configuration to which an input signal (0 or −3) is applied at A. A second transistor 202 is arranged in an emitter follower configuration and the output signal is taken at B. The grounded emitter stage inverts the signal and the emitter follower stage provides a low impedance charge path for the load capacity. The inverter circuit is designed to operate at the levels of 0 and −3 volts.

The emitter of the transistor 200 is grounded, and the base is connected through a diode 204 to ground; through a 100 K resistor 206 to +10 volts D.C.; and through an 8.2 K resistor 208 in parallel with the 47 micromicrofarad condenser 210 to the input terminal A. A 1 microfarad decoupling condenser 212 is connected between +10 volt terminal and ground. The collector of transistor 200 is connected through a diode 214 to −3 volts D.C.; to the base of a transistor 202, and through a 100 microhenry coil 216 in series with a 3.3 K resistor 218 to a −10 volts D.C. A decoupling condenser 220 is connected between a resistor 218 and a −10 volts D.C. terminal to ground. The collector base junction of transistor 200 is reverse biased in the usual manner, and the emitter to base junction is reverse biased to cutoff. Accordingly, when the input is at 0 volts (up), the transistor is cut off, and the only current flowing through the base collector junction is cutoff current (Ico) and the collector is clamped at −3 volts through the diode 214. When the point A of the input is at −3 volts, the voltage across the diode 204 is effectively across the emitter base junction which forward biases the latter and saturation collector current flows through the inverter transistor 200 raising its collector to 0 volts.

Diode 222 is connected between the base of transistor 202 and the emitter, the latter being connected to the terminal B, which is the output terminal of the inverter. The collector base junction of transistor 202 is connected to a −3 volts D.C. and connected between the collector and the output B is a 33 K resistor. A decoupling condenser 226 of 1 microfarad is connected between the collector of transistor 202 and ground. The purpose of the condenser 210 is to provide a low impedance path to the leading edge of input pulses, to pass transients to the base, and improve the rise time of the output circuit. Resistor 208 determines the base current supplied by the preceding stage and resistor 206 is the temperature compensating resistor which provides the current path for Ico insuring a good cutoff bias to the base. The load resistor 218 limits the current passed by transistor 200 and supplies a conduction path to the diode 214. Normally with the 0 volts applied to the base of transistor 200 the collector of the latter is clamped at a −3 volts. Upon receiving a voltage shift from 0 to −3 volts at the base of grounded emitter transistor 200, saturation current flows and the collector moves from a −3 to slightly above 0 volts. This positive shift is applied between base and collector of the emitter follower, and the output is taken across the emitter and the collector.

NOT AND

Figure 6:
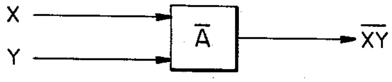
Figure 6 is a functional block diagram of And Not $(\overline{\text{AND}})$ circuit and the truth table for such a circuit.

In Figure 6 there is shown the logical block diagram of a NOT AND ($\bar{A}$) circuit used extensively in the following circuits for "Anding" inputs and presenting this AND function as an output signal that is the inverse of the input. The AND circuit is required to accept at least three inputs and drive other logical blocks such as $\bar{A}$ and Inverter. From the truth table adjacent to the functional block diagram there is shown the conditions of the inputs and the resulting condition of the associated output. It will be noted that when both X and Y are up the input is down. In all other conditions, the output will be up.

Figure 7:
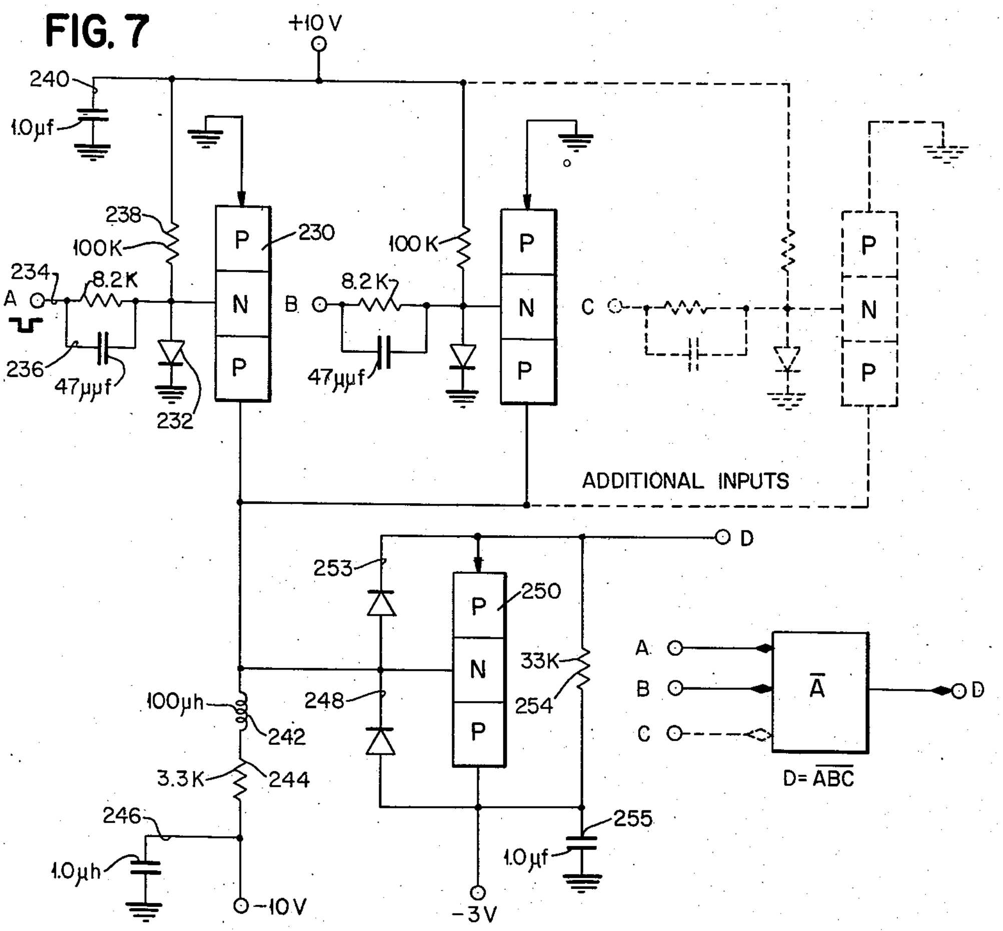
Figure 7 is the transistor diagram of an $\overline{\text{AND}}$ circuit which is illustrated in block form in Figure 6.

With reference to Figure 7, an $\bar{A}$ circuit is shown consisting of inverters connected in parallel, one inverter for each input. If any one or all of the inverters are conducting because the corresponding inputs are down, the resulting current flow through the common collector would cause the output level to rise to 0 volts. If all inputs are up, then each inverter would be cut off and the output level would be down to −3 volts. Each of the inverters comprises identical components and only one inverter will be described. The emitter of the PNP junction transistor 230 is connected to ground and the base is returned to ground through a diode 232. The signal is applied at A to the base through an 8.2 K resistor 234 in parallel with a condenser 236. The base is connected to a +10 volts D.C. through a 100 K resistor 238. A 1 microfarad decoupling condenser 240 is connected between +10 volts D.C. and resistor 232 to ground. The common load consisting of 100 microhenry coil 242 and a 3.3 K resistor 244 in series is connected to a −10 volts D.C. A 1 microhenry condenser 246 is connected to the −10 volts D.C. line for decoupling purposes. The output at the collector of the inverters is clamped at a −3 volts through a diode 248 connected between the collectors of the transistors to −3 volts D.C.

The inverter output is applied to an emitter follower, and the output of the $\bar{A}$ circuit is taken from D. A diode 253 is connected between the base and the emitter of transistor 250, a 33 K resistor 254 is connected between the emitter and the collector, and a 1 microfarad decoupling condenser 255 is connected between the collector of the transistor 250 to ground. It will be noted that additional outputs as shown in dotted lines, may be added to the $\bar{A}$ circuit as desired.

OR AND NOT

Figure 8:
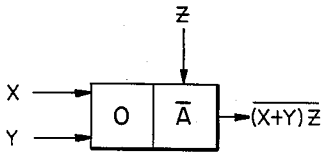
Figure 8 is a block diagram of an OR AND NOT (OR $\overline{\text{AND}}$) circuit and the truth table for the various combinations of inputs with the resulting outputs.
Figure 9:
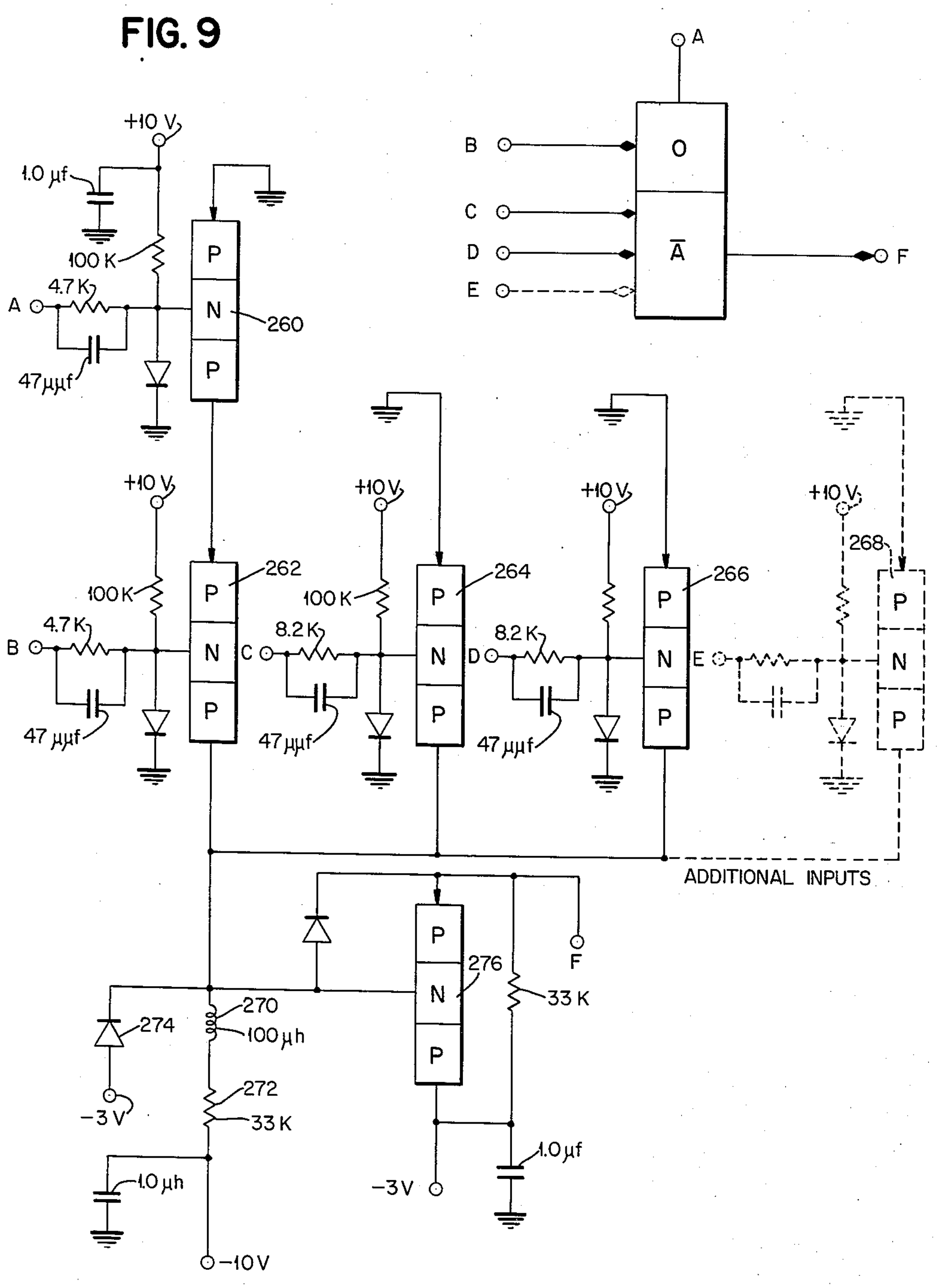
Figure 9 is a circuit diagram for OR $\overline{\text{AND}}$ circuit which is illustrated in block form in Figure 8.

The OR $\bar{A}$ blocks shown in Figure 8 are similar to the $\bar{A}$ circuits described previously with additional inverters connected in series in one of the legs. In Figure 9 inverters are connected in series and form the OR portion of the circuit which is equivalent to one leg of the AND portion in its effect on the circuit. The transistors 260, 262 in the OR portion are biased so that an up level will cause the corresponding transistor to be cut off. Therefore, the entire OR portion will conduct only if all inputs are down permitting the transistors 260 and 262 to conduct. The logic representation shows that the output of the OR portion is applied to a $\bar{A}$ circuit and, accordingly, when any or all inputs to the OR portion are up, and the input to the $\bar{A}$ is up, the output of the combined circuit is down. The output of the OR portion should not be considered as the output of the combined circuit. The truth table shown in Figure 8 is immediately adjacent the functional block diagram.

In Figure 9, the OR $\bar{A}$ circuit comprises the PNP junction transistors 260 and 262 connected as inverters and arranged in series to form the OR portion of the circuit. The connections A and B are those inputs to the OR portion which are shown in the block diagram in Figure 8. The collector of the transistor 262 is connected in parallel with the collectors of the transistors 264, 266 and 268 as legs of the $\overline{\text{AND}}$ circuit previously described with respect to Figure 7. The common load is a 100 microhenry coil 270 in series with a 3.3 K resistor 272 connected to a −10 volts D.C. The output of the common collectors is clamped at a −3 volts D.C. by a diode 274 connected between −3 volts and the common collectors. The voltage shift at the collector of the transistors as previously mentioned is applied to the base of the emitter follower transistor 276, the latter being identical with the emitter follower described earlier in the application. The output of the OR $\bar{A}$ circuit is taken at point F which is across the emitter and the collector of the transistor 276.

Figure 10:
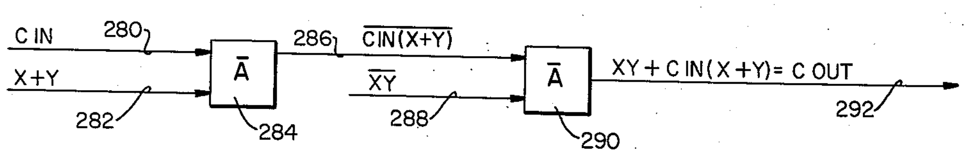
Figure 10 is the logical block diagram for the generation of the carry out of a single position of the adder.

Figure 10 illustrates the operation of one element of the nine-bit carry adder. The "carry in" is applied on line 280 and *x* or *y* is applied to line 282 to the $\bar{A}$ circuit 284. The output is taken from line 286 and comprises $\overline{C_{in}(x+y)}$. Not *x* and Not *y* $\overline{(xy)}$ is applied on line 288 to the AND circuit 290. The output, therefore, would be *x* and *y* or $C_{in}$ and *x* or *y* which equals $C_{out}$ in line 292. It should be noted that the first $\bar{A}$ circuit performs the AND function while the second $\bar{A}$ circuit performs the OR function. It is common practice in transistor logic to use the logic $\bar{A}$ as either AND function, OR function or both. The explanation above applies to carry propagation within each octal bit.

Figure 11:
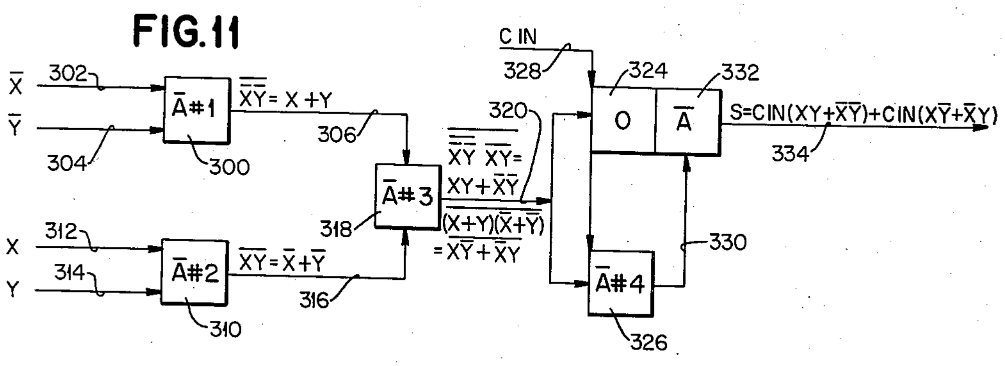
Figure 11 is a logical block diagram of the generation of the sum in a single position of the adder.

In Figure 11 the logical blocks are shown for providing a sum at the output of the adder. Signals $\bar{x}$ and $\bar{y}$ are applied to the $\overline{\text{AND}}$ circuit 300 on lines 302 and 304 respectively. The output is taken from line 306 and consists of *x* or *y*. Signals *x* and *y* are applied to $\overline{\text{AND}}$ circuit 310 on lines 312 and 314. The output is taken from line 316 and consists of $\bar{x}$ or $\bar{y}$. Lines 306 and 316 are the inputs to $\overline{\text{AND}}$ circuit 318, the output of the latter being $x_1$ and $y_1$ or $\overline{x_1}$ and $\overline{y_1}$. This output is taken from line 320 and is applied to both OR circuit 324 and $\overline{\text{AND}}$ circuit 326. "Carry in" is applied on line 328 as an input to both the OR circuit 324 and the $\overline{\text{AND}}$ circuit 326, and the output 330 of $\overline{\text{AND}}$ circuit 326 is applied as an input to the $\overline{\text{AND}}$ circuit 332. The sum is generated on line 334 and is equal to $C_{in}$ and $x$ and $y$ or $C_{in}$ and $\bar{x}$ and $\bar{y}$ or $\bar{C}$ and $x$ and $\bar{y}$ and $\bar{C}$ and $\bar{x}$ and $y$. The function of the first three $\overline{\text{AND}}$s 300, 310 and 318 is to form the "if and only if," $x$ and $y$ or $\bar{x}$ and $\bar{y}$, and the "Exclusive OR," $x$ and $\bar{y}$ or $\bar{x}$ and $y$. The "if and only if" condition is indicated by a positive polarity from $\overline{\text{AND}}$ block 318, and the "exclusive OR" condition is indicated by negative polarity at the output of block 318. Both of these conditions are pertinent for the generation of the sum. When $\overline{\text{AND}}$ 318 is used to form the "if and only if" condition the down outputs from $\overline{\text{AND}}$ 300 and 310 are used.

The following is a truth table for the operation of $\overline{\text{AND}}$s 300, 310 and 318:

| X | Y | Output of 300 | Output of 310 | Output of 318 |
|---|---|---|---|---|
| 0 | 0 | down | up | up |
| 0 | 1 | up | up | down |
| 1 | 0 | up | up | down |
| 1 | 1 | up | down | up |

The following is a truth table for "if and only if":

| Line 328 | Line 320 | Line 334 |
|---|---|---|
| up | up | up |
| down | down | up |
| up | down | down |
| down | up | down |

The following is a truth table for "Exclusive OR":

| Line 328 | Line 320 (Not) | Line 334 |
|---|---|---|
| up | up | up |
| down | down | up |
| up | down | down |
| down | up | down |

The inputs to $\overline{\text{AND}}$ circuit 326 are $C_{in}$ and the "Exclusive OR." The inputs to the OR portion 324 of the OR $\overline{\text{AND}}$ are the $C_{in}$ and the "if and only if." The output of the OR $\overline{\text{AND}}$ will be the "Exclusive OR" sum equal to $C_{in}$ and $x$ and $y$ or C and $\bar{x}$ and $\bar{y}$ or $\bar{C}$ and $x$ and $\bar{y}$ or $\bar{C}$ and $\bar{x}$ and $y$. In order to show that the sum is an "Exclusive OR" expression consider $$\overline{x \text{ and } y \text{ or } \bar{x} \text{ and } \bar{y}}$$

equal to $x$ and $\bar{y}$ or $\bar{x}$ and $y$ equal to $\bar{R}$. Then the sum may be expressed as the "Exclusive OR" of R, and the carry as C and $\bar{R}$ or $\bar{C}$ and R.

Figure 12:
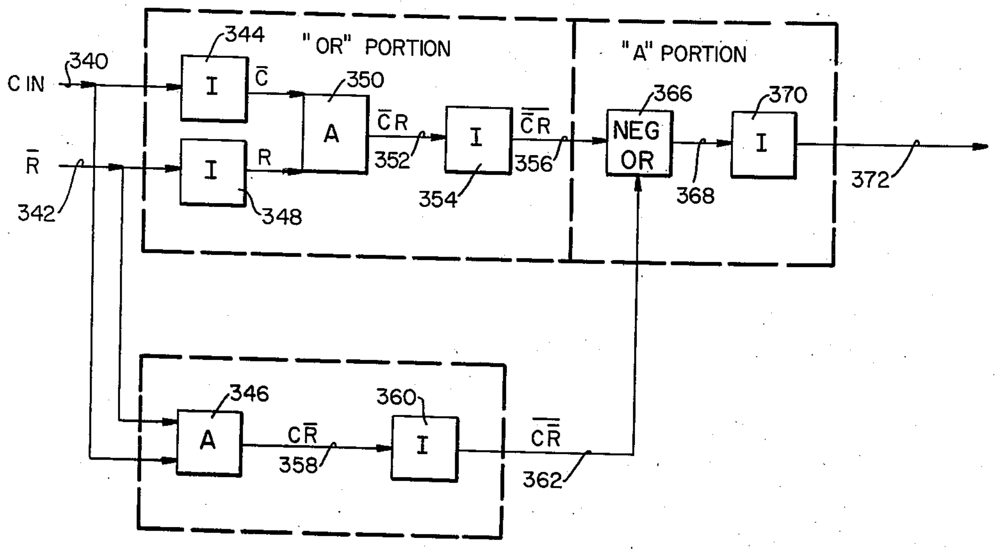
Figure 12 is an illustration of the positive logical blocks required to perform the negative logic of Figure 4.

In Figure 12 there is shown the positive logic blocks which would be required to accomplish the same thing in a similar manner. $C_{in}$ is applied to line 340 to inverter circuit 344 and AND circuit 346 and $\bar{R}$ is applied to line 342 to inverter circuit 348 and AND circuit 346. Accordingly, $\overline{C_{in}}$ and R are applied to AND circuit 350. The output at a line 352 is $\bar{C}$ and R which is then inverted by inverter 354, the output being $\overline{\bar{C} \text{ and } R}$ or $C+\bar{R}$. The output of the AND circuit 346 is taken on a line 358 and inverted by inverter 360 and the output at a line 362 is $\overline{C \text{ and } \bar{R}}$ or $\bar{C}+R$. The lines 356 and 362 are the inputs to a negative OR circuit 366, and the outtput is taken on a line 368 and inverted in an inverter 370. The output of a line 372 would then be the sum equal to C and $\bar{R}$ or $\bar{C}$ and R. It is pointed out that Figures 10 and 11 comprise the adder of Figure 3 shown in functional block diagram 2. $S_0$ represents the sum of $x$ and $y$ as shown in the truth table of Figure 3 where $S_1$ represents $\overline{S_0}$. This is accomplished by an inversion of $S_0$.

As shown in Figure 1*a*, $\overline{\text{AND}}$ blocks 300, 310, 318, 326, 332 and OR circuit 324 comprise the logical blocks for generating the sum as shown in Figure 11 and that the $\overline{\text{AND}}$s 284 and 290 comprise the carry out as shown in Figure 10. The sum is generated on line 334 as shown in bit position 1. The sum generated on line 334 is applied both to $\overline{\text{AND}}$ circuits 380 and 382, and the output of an $\overline{\text{AND}}$ circuit 380 is applied to $\overline{\text{AND}}$ circuit 384. The $\overline{\text{AND}}$ circuits 380 and 384 form a D.C. latching circuit on the output. A clock pulse is applied to line 386, and a falling level appears at the output of either the sum $\overline{S_1}$ or the $\overline{S_0}$ $\overline{\text{AND}}$ circuits 382 and 384 respectively and this falling level is used to set the accumulator flip-flops (not shown). Since this sum may have changed the status of the flip-flop and thus started the operation of a new sum in the adder, this new sum could reach $\overline{\text{AND}}$ circuits 382 and 384 before the clock level has been returned to the down position and an erroneous sum would appear at the outputs. To prevent the generation of erroneous sums, the outputs of $\overline{\text{AND}}$ circuits 382 and 384 are fed back to $\overline{\text{AND}}$ circuits 332 and 380 on sum stops lines 388*a* and 388*b*, respectively. These feedback paths effectively latch up the output of $\overline{\text{AND}}$ circuit 332 and prevent it from changing except when the clock is in the up position. With the clock down, the outputs of $\overline{\text{AND}}$ circuits 382 and 384 are held in the up position for the next upgoing clock signal and the beginning of another cycle.

A group of $\overline{\text{AND}}$ circuits 400, 402, 404, 406 and 408 along with inverters 410 and 412 are used to generate the carry into the fourth position simultaneously with the application of the pulses to the adder inputs. It will be noted that "carry in" is applied through line 416 to $\overline{\text{AND}}$ circuit 405 and that the carry out of bit position 3 is applied to inverter 410 by way of a line 418. This output at a line 420 is developed by the logic as follows:

$C_{out}=D_3+P_3D_2+P_3P_2D_1+P_3P_2P_1C_{in}$ where $C_{out}$ is taken from $\overline{\text{AND}}$ 408 and $C_{in}$ is the "carry in" from line 416. The terms $D_3+P_3P_2D_1$ are taken from the line 418 and applied to the inverter 410, the term $P_3P_2P_1C_{in}$ being generated in $\overline{\text{AND}}$s 400, 402, 404 and 405.

From the explanation thus far, it should be evident that the three bits of positions 4, 5 and 6 of the adder as shown in Figure 1*b* and the three bits of the positions 7, 8 and 9 of the adder as shown in Figure 1*c* along with their carry generation circuits for bit positions 7 and 10 are substantially the same as those shown in Figure 1*a*. Accordingly, it is believed that a detailed explanation of these circuits is unnecessary. In Figure 1*b*, $C_{in}$ enters on the line 416, the carry into bit position 4 enters at the line 420, $D_3+D_2P_3+D_1P_2P_3$ enters on the line 418, and $P_1P_2P_3$ enters on the line 414. The carry into the seventh position is generated with the $\overline{\text{AND}}$ circuits 430, 432, 434, 436, 438 and 440 with an inverter 442. The output is taken from a line 446 from $\overline{\text{AND}}$ 440 and comprises $$D_6+D_5P_6+D_4P_6P_5+D_3P_6P_5P_4+D_2P_6P_5P_4P_3 +D_1P_6P_5P_4P_3P_2+P_6P_5P_4P_3P_2P_1C_{in}$$

as shown at the top of Figure 1*c*. The first three terms are derived from a line 448 in the manner previously described in connection with diagram of Figure 1*a*. The output of $\overline{\text{AND}}$ 326 is $P_4P_5P_6$, which enters $\bar{A}$ 438 as $P_4P_5P_6$ and is inverted in inverters 442 and 448. The output of $\overline{A}$ 438 is $P_1P_2P_3P_4P_5P_6C_{in}$ due to the inputs on lines 418 and 416 and the input from inverter 442. The inputs to $\overline{A}$ 440 are the output of $\overline{A}$ 438 as previously explained, the output on the line 448 via an inverter 450 which is $\overline{D_6+D_5P_6+D_4P_5P_6}$ and the output of an $\overline{A}$ 452, the latter having inputs of $D_3+D_2P_3+D_1P_2P_3$ and $P_4P_5P_6$ resulting in the inputs noted. The output from the line 446 is the expression referred to previously.

An $\overline{A}$ circuit 456 provides an output on a line 458 which is $\overline{C_{in}P_1P_2P_3P_4P_5P_6P_7P_8P_9}$ derived from $\overline{A}$ 452, the lines 414 and 416, and a line 459, the latter providing $P_7P_8P_9$ in the same manner as $P_1P_2P_3$ is generated. An $\overline{A}$ 460 has inputs of $P_7P_8P_9$ from the line 459, $P_4P_5P_6$ from the inverter 448, and $D_3+D_2P_3+D_1P_2P_3$ from the line 418 to, but not through, $\overline{A}$ 452. The output of the $\overline{A}$ 460 or a line 462 is $$(D_3+D_2P_3+D_1P_2P_3)P_4P_5P_6P_7P_8P_9$$

In Figure 1*c*, $C_{out}$ which is the carry into the tenth position is provided on a line 466 and is represented by the expression at the bottom of Figure 2. $C_{out}$ is generated in a group of $\overline{A}$ circuits 470, 472, 474, 476, 478, 480, 481, 482, 484 and 486 and inverters 490 and 492. In the manner previously described $\overline{A}$ 476 provides $P_7P_8P_9$ which is inverted in inverter 490 and provided on the line 459 as $P_7P_8P_9$. The output of $\overline{A}$ 480 is $D_7P_8P_9$, the output of $\overline{A}$ 481 is $D_8P_9$, and the output of an $\overline{A}$ 494 is $\overline{D_9}$ resulting in an output of $\overline{A}$ 482 of $D_9+D_8P_9+D_7P_8P_9$. The output of $\overline{A}$ 478 is $$P_7P_8P_9(D_6+D_6P_6+D_4P_5P_6)$$

which is applied to $\overline{A}$ 486. Other inputs to $\overline{A}$ 486 are $D_9+D_8P_9+D_7P_8P_9$ from the inverter 492 $(D_3+D_2P_3+D_1P_2P_3)P_4P_5P_6P_7P_8P_9$ from $\overline{A}$ 460 on line 462, and $C_{in}P_1P_2P_3P_4P_5P_6P_7P_8P_9$ from $\overline{A}$ 456 on the line 458. Thus the output of $\overline{A}$ 486 is $$D_9+D_8P_9+D_7P_8P_9+D_6P_7P_8P_9 +D_5P_6P_7P_8P_9+D_4P_5P_6P_7P_8P_9 +D_3P_4P_5P_6P_7P_8P_9+D_2P_3P_4P_5P_6P_7P_8P_9 +D_1P_2P_3P_4P_5P_6P_7P_8P_9+C_{in}P_1P_2P_3P_4P_5P_6P_7P_8P_9$$

It will be understood that the selection of octal groups is for convenience only and that the invention may be practiced with other numerical groups and that individual carry generation circuits may be provided for each adder order in keeping with the principles of this invention.

Furthermore, the transistor circuits are merely illustrative of those which may be used to perform the invention and it is pointed out that other transistor circuits or other logical devices utilizing other circuit elements may be used in the practice of the invention.

While there have been shown and described and pointed out the fundamental novel features of the invention as applied to a preferred embodiment, it will be understood that various omissions and substitutions and change in the form and details of the device illustrated and in its operation may be made by those skilled in the art without departing from the spirit of the invention. It is the intention, therefore, to be limited only as indicated by the scope of the following claims:

What is claimed is:

1. In apparatus for forming the sum of two binary numbers including $\overline{\text{AND}}$ logical devices, each having input and output means and adapted to provide a false binary representation at said output means when said input means are exclusively true and otherwise to provide a true binary representation, a first $\overline{\text{AND}}$ logical device and a second $\overline{\text{AND}}$ logical device each having a pair of inputs and an output, means applying the binary representation *x* and a binary representation *y* to said first $\overline{\text{AND}}$ circuit, means applying the negative of said binary numbers *x* and *y* to said second $\overline{\text{AND}}$ circuit, a third $\overline{\text{AND}}$ circuit having a pair of inputs and an output, means connecting the output of said first and second $\overline{\text{AND}}$ circuits to the input of said third $\overline{\text{AND}}$ circuit, a fourth $\overline{\text{AND}}$ circuit having two inputs and an output, an OR circuit having a pair of inputs and an output, means coupling a "carry in" signal to one of said inputs of said OR circuit and one of said inputs to said fourth $\overline{\text{AND}}$ circuit, means connecting the output of said third $\overline{\text{AND}}$ circuit to the other of said inputs to said OR circuit and the other of said inputs to said fourth $\overline{\text{AND}}$ circuit, a fifth $\overline{\text{AND}}$ circuit having a pair of inputs and an output, means connecting the output of said OR circuit to one of said inputs of said fifth $\overline{\text{AND}}$ circuit, and means connecting the output of said fourth $\overline{\text{AND}}$ circuit to the other input of said fifth $\overline{\text{AND}}$ circuit.

2. In apparatus for forming the sum of two binary numbers including $\overline{\text{AND}}$ logical devices responsive to true and false binary signals and adapted to provide a false output signal when said inputs are all true signals and otherwise to provide a true output signal, a first $\overline{\text{AND}}$ logical device and a second $\overline{\text{AND}}$ logical device, each having a pair of inputs and a single output, means applying a binary signal *x* and a binary signal *y* to said first $\overline{\text{AND}}$ circuit, means applying the negative of said binary numbers *x* and *y* to said second $\overline{\text{AND}}$ circuit, a third $\overline{\text{AND}}$ circuit having a pair of inputs and an output, means connecting the outputs of said first and second $\overline{\text{AND}}$ circuits to the input of said third $\overline{\text{AND}}$ circuit, a fourth $\overline{\text{AND}}$ circuit having two inputs and an output, an OR circuit having a pair of inputs and an output, means coupling a "carry in" signal to one of said inputs of said OR circuit and one of said inputs of said fourth $\overline{\text{AND}}$ circuit, means connecting the output of said third $\overline{\text{AND}}$ circuit to the other of said inputs of said OR circuit and the other of said inputs to said fourth $\overline{\text{AND}}$ circuit, a fifth $\overline{\text{AND}}$ circuit having a pair of inputs and an output, means connecting the output of said OR circuit to one of said inputs of said fifth $\overline{\text{AND}}$ circuit, and means connecting the output of said fourth $\overline{\text{AND}}$ circuit to the other input of said fifth $\overline{\text{AND}}$ circuit.

3. Apparatus in accordance with said claim 2 wherein additional means are provided for generating a carry out comprising a sixth $\overline{\text{AND}}$ circuit having a pair of inputs and an output, means connecting the second $\overline{\text{AND}}$ circuit output to one of the inputs of said sixth $\overline{\text{AND}}$ circuit, means connecting the "carry in" signal to the other of said inputs of said sixth $\overline{\text{AND}}$ circuit, a seventh $\overline{\text{AND}}$ circuit having a pair of inputs and an output, means connecting the first of said $\overline{\text{AND}}$ circuit outputs to one of the inputs of said seventh $\overline{\text{AND}}$ circuit, and means connecting the output of said sixth $\overline{\text{AND}}$ circuit to the other of said inputs to said seventh $\overline{\text{AND}}$ circuit.

4. Apparatus for generating a carry from an octal adder to a fourth order of an adder including $\overline{\text{AND}}$ circuits responsive to true and false binary signals and adapted to provide a false output signal when the inputs are all true signals and otherwise provide a true output signal comprising means providing signals indicative of binary bits of a number $x$ and a number $y$ and a "carry in" ($C_{in}$) to said adder orders, a first $\overline{\text{AND}}$ circuit having a pair of inputs and an output, means applying the negative of $x_2$ and $y_2$ to said inputs, a second $\overline{\text{AND}}$ circuit, having a pair of inputs and an output, means providing the negative of $x_3$ and $y_3$ to said inputs of said second $\overline{\text{AND}}$ circuit, a third $\overline{\text{AND}}$ circuit having four inputs and a pair of outputs, means coupling signals $x_1$ and $x_2$ to two of said inputs, means coupling the outputs of said first and second $\overline{\text{AND}}$ circuits to the other of two inputs of said third $\overline{\text{AND}}$ circuit, a fourth $\overline{\text{AND}}$ circuit having three inputs and an output, means coupling one of the outputs of said third $\overline{\text{AND}}$ circuit to one of the inputs of said fourth $\overline{\text{AND}}$ circuit, means providing $x_2$ and $y_2$ to the other two inputs of said fourth $\overline{\text{AND}}$ circuit, a fifth $\overline{\text{AND}}$ circuit having three inputs and an output, a sixth $\overline{\text{AND}}$ circuit having two inputs and an output, means coupling $x_3$ and $y_3$ to said sixth $\overline{\text{AND}}$ circuit, said output of said sixth $\overline{\text{AND}}$ circuit being connected to one of the inputs of said fifth $\overline{\text{AND}}$ circuit, means connecting the other of said outputs of said third $\overline{\text{AND}}$ circuit to another of said inputs of said fifth $\overline{\text{AND}}$ circuit, means connecting the output of said fourth $\overline{\text{AND}}$ circuit to the input of said fifth $\overline{\text{AND}}$ circuit, a seventh $\overline{\text{AND}}$ circuit having a pair of inputs and an output, means applying the negative of $x_1$ and $y_1$ to said inputs of said seventh $\overline{\text{AND}}$ circuit, an eighth $\overline{\text{AND}}$ circuit having two inputs and an output, means applying the negative of $x_2$ and $y_2$ to said inputs of said eighth $\overline{\text{AND}}$ circuit, a ninth $\overline{\text{AND}}$ circuit having a pair of inputs and an output, means applying the negative of $x_3$ and $y_3$ to said inputs of said ninth $\overline{\text{AND}}$ circuit, a tenth $\overline{\text{AND}}$ circuit having four inputs and an output, means connecting the outputs of said seventh, eighth and ninth $\overline{\text{AND}}$ circuits to a respective one of said inputs of said tenth $\overline{\text{AND}}$ circuit, means connecting the "carry in" to the other of said inputs of said tenth $\overline{\text{AND}}$ circuit, an inverter having an input and an output, means connecting the output of said fifth $\overline{\text{AND}}$ circuit to the input of said inverter circuit, an eleventh $\overline{\text{AND}}$ circuit having two inputs and an output, means connecting the output of said tenth $\overline{\text{AND}}$ circuit to one of the inputs of said eleventh $\overline{\text{AND}}$ circuit, and means connecting the output of said inverter circuit to the other of said inputs of said eleventh $\overline{\text{AND}}$ circuit.

5. In an adder for the parallel addition of binary numbers of which the serial carry operation is broken into groups and the carries between groups are generated simultaneously with the addition of said binary numbers and $\overline{\text{AND}}$ logical devices are employed which are responsive to true and false binary signals so that a false output is provided when the inputs are all true signals and otherwise a true output signal is provided, a group of adders comprising at least one adder having a first $\overline{\text{AND}}$ logical device and a second $\overline{\text{AND}}$ logical device, each having a pair of inputs and an output, means applying a binary representation $x$ and a binary representation $y$ to said first $\overline{\text{AND}}$ circuit, means applying the negative of said binary numbers $x$ and $y$ to said second $\overline{\text{AND}}$ circuit, a third $\overline{\text{AND}}$ circuit having a pair of inputs and an output, means connecting the outputs of said first and second $\overline{\text{AND}}$ circuits to the input of said third $\overline{\text{AND}}$ circuit, a fourth $\overline{\text{AND}}$ circuit having two inputs and an output, an OR circuit having a pair of inputs and an output, means coupling a "carry in" signal to one of said inputs of said OR circuit and one of said inputs of said fourth $\overline{\text{AND}}$ circuit, means connecting the output of said third $\overline{\text{AND}}$ circuit to the other of said inputs to said OR circuit, and the other of said inputs to said fourth $\overline{\text{AND}}$ circuit, a fifth $\overline{\text{AND}}$ circuit having a pair of inputs and an output, means connecting the output of said OR circuit to one of said inputs of said fifth $\overline{\text{AND}}$ circuit, means connecting the output of said fourth $\overline{\text{AND}}$ circuit to the input of said fifth $\overline{\text{AND}}$ circuit, and carry generation means for propagating a carry out of at least one of said groups simultaneously with the parallel addition of said binary numbers.

6. In an adder for the parallel addition of binary numbers of which the serial carry operation is broken up into octal groups of three adder orders and carries between said groups are generated simultaneously with the addition of said binary numbers and $\overline{\text{AND}}$ logical devices are employed which are responsive to true and false binary signals so that a false output is provided when the inputs are all true signals and otherwise a true output signal is provided, an adder for each order of said groups comprising at least one adder having a first $\overline{\text{AND}}$ logical device and a second $\overline{\text{AND}}$ logical device, each having a pair of inputs and an output, means applying a binary representation $x$ and a binary representation $y$ to said first $\overline{\text{AND}}$ circuit, means applying the negative of said binary numbers $x$ and $y$ to said second $\overline{\text{AND}}$ circuit, a third $\overline{\text{AND}}$ circuit having a pair of inputs and an output, means connecting the output of said first and second $\overline{\text{AND}}$ circuits to the inputs of said third $\overline{\text{AND}}$ circuit, a fourth $\overline{\text{AND}}$ circuit having two inputs and an output, an OR circuit having a pair of inputs and an output, means coupling a "carry in" signal to one of said inputs of said OR circuit and one of said inputs of said fourth $\overline{\text{AND}}$ circuit, means connecting the output of said third $\overline{\text{AND}}$ circuit to the other of said inputs of said OR circuit and the other of said inputs to said fourth $\overline{\text{AND}}$ circuit, a fifth $\overline{\text{AND}}$ circuit having a pair of inputs and an output, means connecting the output of said OR circuit to one of said inputs of said fifth $\overline{\text{AND}}$ circuit, means connecting the output of said fourth $\overline{\text{AND}}$ circuit to the input of said fifth $\overline{\text{AND}}$ circuit, and carry generation means for propagating a carry out of at least one of said groups simultaneously with the parallel addition of said binary numbers comprising a sixth $\overline{\text{AND}}$ circuit having a pair of inputs and an output, means applying the negative of $x_2$ and $y_2$ to said inputs, a seventh $\overline{\text{AND}}$ circuit having a pair of inputs and an output, means providing the negative of $x_3$ and $y_3$ to said inputs of said seventh $\overline{\text{AND}}$ circuit, an eighth $\overline{\text{AND}}$ circuit having four inputs and a pair of outputs, means coupling signals $x_1$ and $x_2$ to two of said inputs, means coupling the output of said sixth and seventh $\overline{\text{AND}}$ circuits to the other of two inputs of said eighth $\overline{\text{AND}}$ circuit, a ninth $\overline{\text{AND}}$ circuit having three inputs and an output, means coupling one of the outputs of said eighth $\overline{\text{AND}}$ circuit to one of the inputs of said ninth $\overline{\text{AND}}$ circuit, means providing $x_2$ and $y_2$ to the other two inputs of said ninth $\overline{\text{AND}}$ circuit, a tenth $\overline{\text{AND}}$ circuit having three inputs and an output, an eleventh $\overline{\text{AND}}$ circuit having two inputs and an output, means coupling $x_3$ and $y_3$ to said eleventh $\overline{\text{AND}}$ circuit, said output of said eleventh $\overline{\text{AND}}$ circuit being connected to one of the inputs of said tenth $\overline{\text{AND}}$ circuit, means connecting the other of said outputs of said eighth $\overline{\text{AND}}$ circuit to another of said inputs of said tenth $\overline{\text{AND}}$ circuit, means connecting the output of said ninth $\overline{\text{AND}}$ circuit to the input of said tenth $\overline{\text{AND}}$ circuit, a twelfth $\overline{\text{AND}}$ circuit having a pair of inputs and an output, means applying the negative of $x_1$ and $y_1$ to said inputs of said seventh $\overline{\text{AND}}$ circuit, a thirteenth $\overline{\text{AND}}$ circuit having two inputs and an output, means applying the negatives of $x_2$ and $y_2$ to said inputs of said thirteenth $\overline{\text{AND}}$ circuit, a fourteenth $\overline{\text{AND}}$ circuit having a pair of inputs and an output, means applying the negative of $x_3$ and $y_3$ to said inputs of said fourteenth $\overline{\text{AND}}$ circuit, a fifteenth $\overline{\text{AND}}$ circuit having four inputs and an output, means connecting the outputs of said twelfth, thirteenth and fourteenth $\overline{\text{AND}}$ circuits to the respective one of said inputs of said fifteenth $\overline{\text{AND}}$ circuit, means connecting the "carry in" to the other of said inputs of said fifteenth $\overline{\text{AND}}$ circuit, an inverter having an input and an output, means connecting the output of said tenth $\overline{\text{AND}}$ circuit to the input of said inverter circuit, a sixteenth $\overline{\text{AND}}$ circuit having two inputs and an output, means connecting the output of said fifteenth $\overline{\text{AND}}$ circuit to one of the inputs of said sixteenth $\overline{\text{AND}}$ circuit, and means connecting the output of said inverter circuit to the other of said inputs of said sixteenth $\overline{\text{AND}}$ circuit.

7. In an adder for the parallel addition of binary numbers in which the serial carry operation is broken up into octal groups of three adder orders and carries between said groups are generated simultaneously with the addition of said binary numbers and $\overline{\text{AND}}$ circuits are employed which are responsive to true and false binary signals so that a false output is provided when the inputs are all true signals and otherwise a true output signal is provided, an adder for each order of said groups and at least one carry generation circuit for an octal group comprising means providing signals indicative of binary bits from a number $x$ and a number $y$ and a "carry in," a first $\overline{\text{AND}}$ circuit having a pair of inputs and an output, means applying the negative of $x_2$ and $y_2$ to said inputs, a second $\overline{\text{AND}}$ circuit, means providing the negative of $x_3$ and $y_3$ to said inputs, a third $\overline{\text{AND}}$ circuit having four inputs and a pair of outputs, means coupling signals $x_1$ and $x_2$ to two of said inputs, means coupling the output of said first and second $\overline{\text{AND}}$ circuit to the other of two inputs of said third $\overline{\text{AND}}$ circuit, a fourth $\overline{\text{AND}}$ circuit having three inputs, means coupling one of the outputs of said third $\overline{\text{AND}}$ circuit to one of the inputs of said fourth $\overline{\text{AND}}$ circuit, means applying $x_2$ and $y_2$ to the other two inputs of said fourth $\overline{\text{AND}}$ circuit, a fifth $\overline{\text{AND}}$ circuit having three inputs and an output, a sixth $\overline{\text{AND}}$ circuit having a pair of inputs and an output, means coupling $x_3$ and $y_3$ to said sixth $\overline{\text{AND}}$ circuit, said output of said sixth $\overline{\text{AND}}$ circuit being connected to the input of said fifth $\overline{\text{AND}}$ circuit, means connecting the other two of said outputs of said third $\overline{\text{AND}}$ circuit to another of said inputs of said fifth $\overline{\text{AND}}$ circuit, means connecting the output of said fourth $\overline{\text{AND}}$ circuit to the input of said fifth $\overline{\text{AND}}$ circuit, a seventh $\overline{\text{AND}}$ circuit having a pair of inputs and an output, means applying the negative of $x_1$ and $y_1$ to said inputs of said seventh $\overline{\text{AND}}$ circuit, an eighth $\overline{\text{AND}}$ circuit having two inputs and an output, means applying the negative of $x_2$ and $y_2$ to said inputs of said eighth $\overline{\text{AND}}$ circuit, a ninth $\overline{\text{AND}}$ circuit having a pair of inputs and an output, means applying the negative of $x_3$ and $y_3$ to said inputs of said ninth $\overline{\text{AND}}$ circuit, a tenth $\overline{\text{AND}}$ circuit having four inputs and an output, means connecting the output of said seventh, eighth and ninth $\overline{\text{AND}}$ circuits to a respective one of said inputs of said tenth $\overline{\text{AND}}$ circuit, means connecting the "carry in" signal to the other of said inputs of said tenth $\overline{\text{AND}}$ circuit, an inverter having an input and an output, means connecting the output of said fifth $\overline{\text{AND}}$ circuit to the input of said inverter circuit, an eleventh $\overline{\text{AND}}$ circuit having two inputs and an output, means connecting the output of said tenth $\overline{\text{AND}}$ circuit to one of the inputs of said eleventh $\overline{\text{AND}}$ circuit, and means connecting the output of said inverter circuit to the other of said inputs of said eleventh $\overline{\text{AND}}$ circuit.

8. In an adder for the parallel addition of binary numbers having groups of orders in which the carry operation is serial within groups and $\overline{\text{AND}}$ logic devices are employed which are responsive to true and false binary signals so that a false output is provided when the inputs are all true signals, an adder for each order of said groups, means coupling the "carry in" signal to said adder, means applying binary numbers in parallel to said adder orders, carry generating means comprising negative logic transistor circuits for performing $\overline{\text{AND}}$ functions and OR functions to generate carries between said groups simultaneously with the addition of said numbers, means applying said binary numbers to said carry generating means, and means applying said "carry in" signal to said carry generating means.

References Cited in the file of this patent

UNITED STATES PATENTS

| | | |
|---|---|---|
| 2,719,670 | Jacobs et al. | Oct. 4, 1955 |
| 2,879,001 | Weinberger et al. | Mar. 24, 1959 |

OTHER REFERENCES

Weinberger: A One-Microsecond Adder Using One-Megacycle Circuitry, IRE Transactions on Electronic Computers, vol. EC-5, No. 2, June 1956, pps. 65 to 73.